US012640319B2

(12) United States Patent
Kakimoto et al.

(10) Patent No.: US 12,640,319 B2
(45) Date of Patent: May 26, 2026

(54) PUSH BUTTON SWITCH

(71) Applicant: OMRON Corporation, Kyoto (JP)

(72) Inventors: Naoya Kakimoto, Kyoto (JP); Hajime Kawai, Kyoto (JP); Shigenobu Kishi, Kyoto (JP); Junichi Seto, Kyoto (JP)

(73) Assignee: OMRON Corporation, Kyoto (JP)

( * ) Notice: Subject to any disclaimer, the term of this patent is extended or adjusted under 35 U.S.C. 154(b) by 76 days.

(21) Appl. No.: 18/027,117

(22) PCT Filed: Sep. 15, 2021

(86) PCT No.: PCT/JP2021/033840

§ 371 (c)(1),
(2) Date: Mar. 19, 2023

(87) PCT Pub. No.: WO2022/080071

PCT Pub. Date: Apr. 21, 2022

(65) Prior Publication Data

US 2023/0335353 A1 Oct. 19, 2023

(30) Foreign Application Priority Data

Oct. 14, 2020 (JP) ................................ 2020-173102

(51) Int. Cl.
*H01H 13/20* (2006.01)
*H01H 13/14* (2006.01)

(52) U.S. Cl.
CPC ............ *H01H 13/20* (2013.01); *H01H 13/14* (2013.01)

(58) Field of Classification Search
CPC ........ H01H 13/12; H01H 13/14; H01H 13/20; H01H 13/22; H01H 13/26; H01H 13/28;
(Continued)

(56) References Cited

U.S. PATENT DOCUMENTS 5,397,890 A * 3/1995 Schueler .............. A01D 34/828 250/221
7,675,026 B2 * 3/2010 Lum .................... G01D 5/3473 345/169

(Continued)

FOREIGN PATENT DOCUMENTS

CN 111362083 7/2020
JP S6030419 3/1985

(Continued)

OTHER PUBLICATIONS

"International Search Report (Form PCT/ISA/210) of PCT/JP2021/033840", mailed on Nov. 16, 2021, with English translation thereof, pp. 1-4.

(Continued)

*Primary Examiner* — Franklin D Balseca
(74) *Attorney, Agent, or Firm* — JCIPRNET

(57) ABSTRACT

A push button switch 1 comprises: a push button 10 that can be pushed in; a movable contact 120 that is linked to the push button 10; and a fixed contact 121 that comes into contact with or separates from the movable contact 120 by operation of the movable contact 120. The push button switch 1 further comprises a light-emitting element 130 for emitting light, and a light-receiving element 131 for detecting light. The light-receiving element 131 is disposed so as to detect the light emitted from the light-emitting element 130 and reflected by an object within a prescribed region. The push button switch 1 outputs an ON signal if the push button 10 has been pushed in, thereby causing the movable contact 120 to come into contact with the fixed contact 121, or if it is determined that the light-receiving element 131 has detected light reflected by an object.

7 Claims, 10 Drawing Sheets

(58) Field of Classification Search
CPC ........ H01H 13/30; H01H 13/34; H01H 13/36; H01H 13/50
See application file for complete search history.

(56) References Cited

U.S. PATENT DOCUMENTS

| | | | | |
|---|---|---|---|---|
| 8,502,774 | B2 * | 8/2013 | Yamamoto | G06F 3/0346 345/157 |
| 2025/0029796 | A1 * | 1/2025 | Kakimoto | H03K 17/941 |

FOREIGN PATENT DOCUMENTS

| | | | | |
|---|---|---|---|---|
| JP | S6215737 | | 1/1987 | |
| JP | S62261982 | | 11/1987 | |
| JP | H02200007 | | 8/1990 | |
| JP | H05299997 | | 11/1993 | |
| JP | H10132559 | | 5/1998 | |
| JP | H11144577 | | 5/1999 | |
| JP | H11242926 | | 9/1999 | |
| JP | 2000057873 | | 2/2000 | |
| JP | 2001035297 | | 2/2001 | |
| JP | 2001035297 | A * | 2/2001 | H01H 13/02 |
| JP | 2003287420 | | 10/2003 | |
| JP | 2007052928 | | 3/2007 | |
| JP | 2013088403 | | 5/2013 | |
| JP | 2013206836 | | 10/2013 | |
| JP | 2016004767 | | 1/2016 | |
| JP | 2018181762 | | 11/2018 | |
| JP | 2019045278 | | 3/2019 | |
| JP | 6841372 | | 3/2021 | |
| WO | 2009020204 | | 2/2009 | |

OTHER PUBLICATIONS

"Written Opinion of The International Searching Authority (Form PCT/ISA/237) of PCT/JP2021/033840", mailed on Nov. 16, 2021, with English translation thereof, pp. 1-8.
"Notice of Reasons for Refusal of Japan Counterpart Application", issued on Nov. 5, 2024, with English translation thereof, p. 1-p. 4.
"Office Action of Japan Counterpart Application", issued on Jul. 1, 2025, with English translation thereof, p. 1-p. 12.

* cited by examiner

PUSH BUTTON SWITCH

CROSS-REFERENCE TO RELATED APPLICATION

This application is a 371 application of the International PCT application serial no. PCT/JP2021/033840, filed on Sep. 15, 2021, which claims the priority benefits of Japan Patent Application No. 2020-173102, filed on Oct. 14, 2020. The entirety of each of the above-mentioned patent applications is hereby incorporated by reference herein and made a part of this specification.

TECHNICAL FIELD

The invention relates to a push button switch having an operation mechanism.

RELATED ART

Push button switches are used in various machines such as elevators. For example, the applicant of the present application has proposed a push button switch applicable for operation of an elevator in Patent Document 1. The push button switch recited in Patent Document 1 is operated by directly pushing.

CITATION LIST

Patent Literature

[Patent Document 1] Japanese Laid-open No. 2016-4767

SUMMARY OF INVENTION

Technical Problem

Recently, however, there is an increasing demand for a push button switch operable in a contactless manner to facilitate convenience and secure public health, etc. Nevertheless, as described in Patent Document 1, the demand for a push button switch that performs an operation by pushing directly is still high.

The invention has been made in view of such matter, and an objective is to provide a push button switch not only operable by a pushing operation, but also operable in a contactless manner.

Solution to Problem

In order to solve the above issue, a push button switch according to the invention includes a push button that is pushable; a movable contact that is linked to the push button; and a fixed contact that comes into contact or separates from the movable contact through operation of the movable contact. The push button switch includes: a light emitting element, emitting light; and a light receiving element, detecting light. The light receiving element is disposed so as to detect light emitted from the light emitting element and reflected by an object within a prescribed region In addition, the push button switch includes a light shielding member covering the light emitting element. A light passing part allowing the light emitted by the light emitting element to pass through is formed at the light shielding member.

In addition, the push button switch includes a light shielding member covering the light receiving element. A light passing part allowing light to be received by the light receiving element to pass through is formed at the light shielding member.

In addition, the push button switch includes a lens for light emission that limits an irradiation range of the light emitted by the light emitting element.

In addition, the push button switch includes a lens for light reception that limits a range of light received by the light receiving element.

In addition, the push button switch includes a light shielding member covering the light emitting element and the light receiving element. In the light shielding member, a light passing part allowing the light emitted by the light emitting element and light to be received by the light receiving element to pass through is formed. The light shielding member includes: a lens for light emission that limits an irradiation range of the light emitted by the light emitting element; and a lens for light reception that limits a range of light received by the light receiving element.

In addition, the push button switch includes: an illumination member which illuminates the push button with visible light from an inner side.

The push button switch of the invention includes a push button that is pushable and a light receiving element that detects light emitted from the light emitting element and reflected.

Effects of Invention

The push button switch according to the invention includes the push button that is pushable, the light emitting element and the light receiving element. The light receiving element detects the light emitted from the light emitting element and reflected by an object within the prescribed region. Accordingly, in addition to a pushing operation, the push button switch according to the invention achieves excellent effects, such as allowing a contactless operation by detecting light reflected by an object within the prescribed region.

DESCRIPTION OF EMBODIMENTS

In the following, the embodiments of the invention will be described with reference to the drawings.

Application Example

Figure 1:
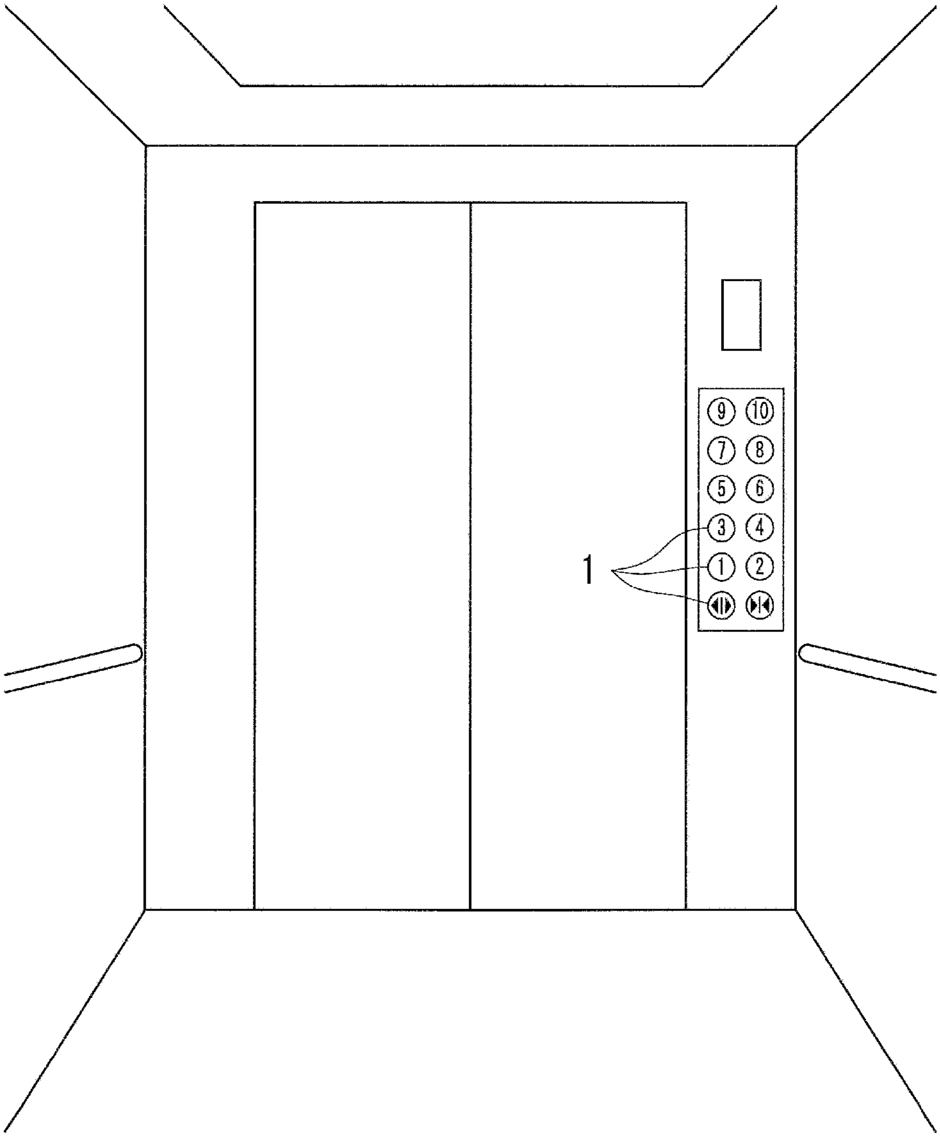
FIG. 1 is a schematic view illustrating an example of an elevator to which a push button switch according to the invention is applied.

A push button switch according to the invention is, for example, used as a switch for operating an elevator. In the following, a push button switch 1 as shown in the drawings is described with reference to the drawings. FIG. 1 is a schematic view illustrating an example of an elevator in which the push button switch 1 according to the invention is applied. FIG. 1 illustrates multiple push button switches 1 arranged in an operation panel in a cage that is lifted or lowered as an elevator. The push button switch 1 of the invention is applied to various push button switches 1, such as a push button switch 1 on which a number indicating the destination floor is labeled, a push button switch 1 on which a symbol used for an operation of opening or closing the door is labeled, etc. It is noted that the push button switch 1 described in the invention is not only applicable to the push button switch 1 arranged in the operation panel inside the cage of the elevator, but is also applicable to various push button switches 1, such as a push button switch 1 for calling the cage in an operation panel at the location where the elevator is lifted and lowered.

First Embodiment

Configuration Example

Figure 2:
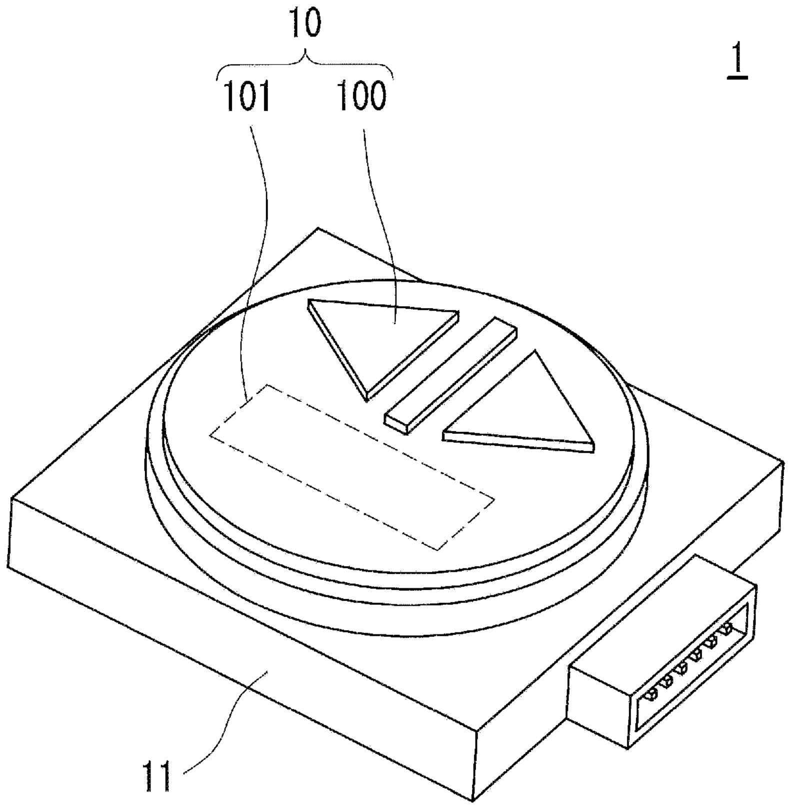
FIG. 2 is a schematic perspective view illustrating an example of the appearance of the push button switch according to the invention.

FIG. 2 is a schematic perspective view illustrating an example of the appearance of the push button switch 1 according to the invention. The push button switch 1 includes a push button 10 and a housing 11 in which the push button 10 is disposed. In the invention, the direction in which the push button 10 is disposed with respect to the housing is defined as the front, and the direction in which the push button 10 is pushed in is defined as the rear. But these directions are merely defined for the ease of description, and the direction in which the push button switch 1 of the invention is disposed is not limited thereto. The push button 10 is formed in a substantially disc shape. The push button switch 1 shown in FIG. 2 is the push button 10 used in a door opening/closing operation, and is formed with a label part 100 imitating the shape of a door opening symbol, etc., showing opening of a door. The label part 100, for example, is formed by using a semi-transparent resin, etc., and allows visible light emitted from the inside of the push button switch 1 to pass through. Below the door opening symbol in FIG. 2, as indicated by a broken line in the drawing, a translucent part 101 allowing light, such as infrared light, transmitted from the inside of the push button switch 1 to pass through is formed. The housing 11 is formed in a substantially rectangular parallelepiped shape, and the push button 10 is disposed on the front surface.

Figure 3:
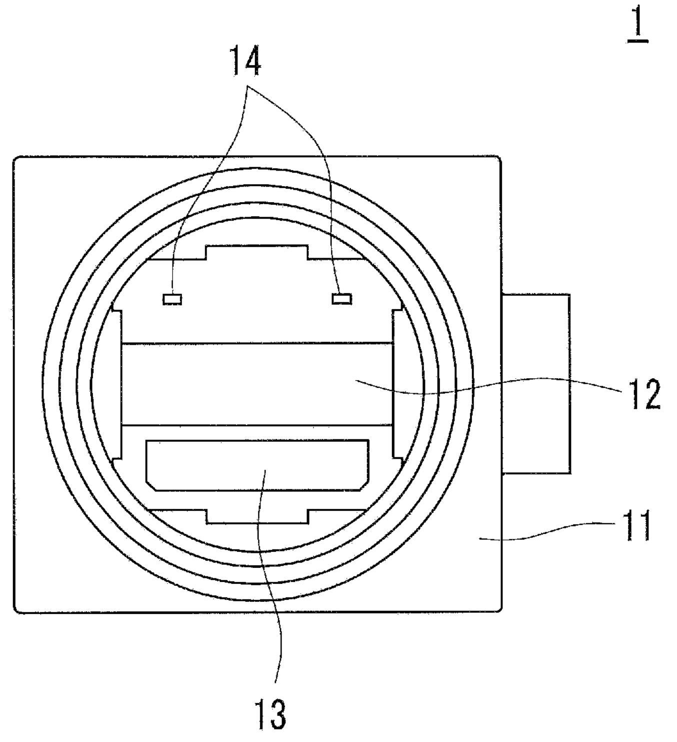
FIG. 3 is a schematic front view illustrating an example of an internal configuration of the push button switch according to the invention.

FIG. 3 is a schematic front view illustrating an example of an internal configuration of the push button switch 1 according to the invention. FIG. 3 illustrates a state in which the push button 10 is removed to understand the internal configuration of the push button switch 1 from the front surface. The push button switch 1 accommodates various mechanisms and components, such as a mechanical contact mechanism 12, a contactless detection mechanism 13, and an illumination member 14, inside the housing 11.

The mechanical contact mechanism 12 is a mechanism outputting a signal by pushing the push button 10. The contactless detection mechanism 13 is a mechanism detecting an object, such as a human finger, in a contactless manner and outputting a signal.

The illumination member 14 is a member that includes an element, such as a light emitting diode (LED) emitting visible light, such as white light, that illuminates the push button from the inside. The light emitted from the illumination member 14 is irradiated to the outside through the label part 100 of the push button 10. By irradiating the push button 10 with the light emitted from the illumination member 14 from the inside, the operator operating the elevator can visually recognize the push button 10 in which the label part 100 emits light.

Figure 4:
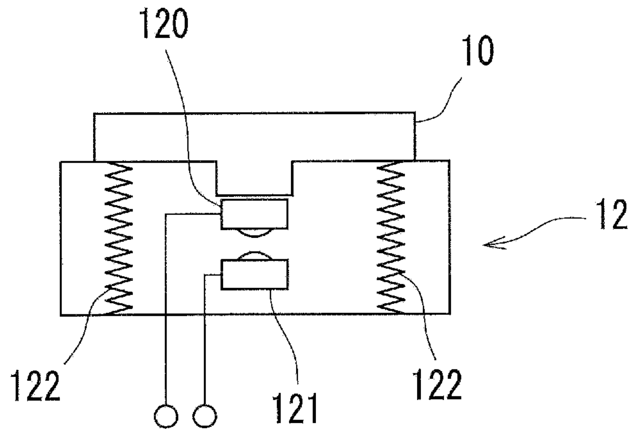
FIG. 4 is a schematic cross-sectional view schematically illustrating an example of a mechanical contact mechanism included in the push button switch according to the invention.

The mechanical contact mechanism 12 is further described. FIG. 4 is a schematic cross-sectional view schematically illustrating an example of the mechanical contact mechanism 12 included in the push button switch 1 according to the invention. FIG. 4 schematically illustrates a cross-section of the mechanical contact mechanism 12, so that the top in the figure is the front of the push button switch 1. The mechanical contact mechanism 12 is a mechanism that outputs a signal by pushing the push button 10, and includes various components such as a movable contact 120, a fixed contact 121, a biasing member 122, etc. The movable contact 12 is a contact attached to the rear part of the push button 10 and linked with the push button 10. The fixed contact 121 is a contact fixed in the housing 11. The biasing member 122 is a compression spring, etc., that urges the push button 10 forward.

Figure 5:
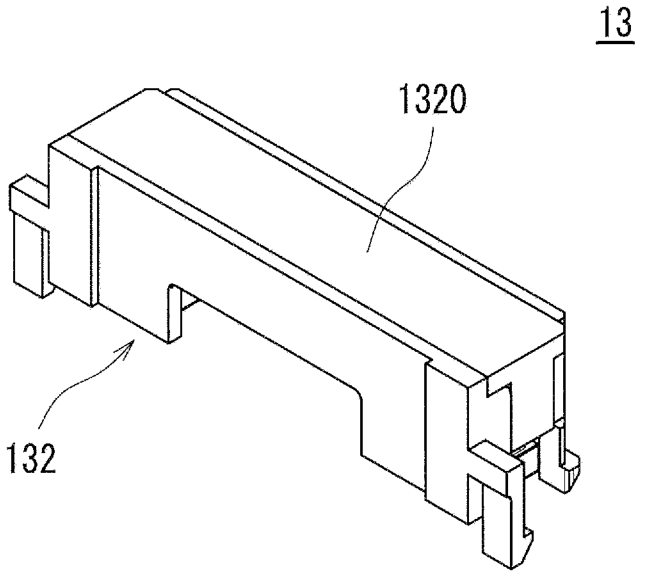
FIG. 5 is a schematic perspective view illustrating an example of a contactless detection mechanism included in the push button switch according to the invention.
Figure 6:
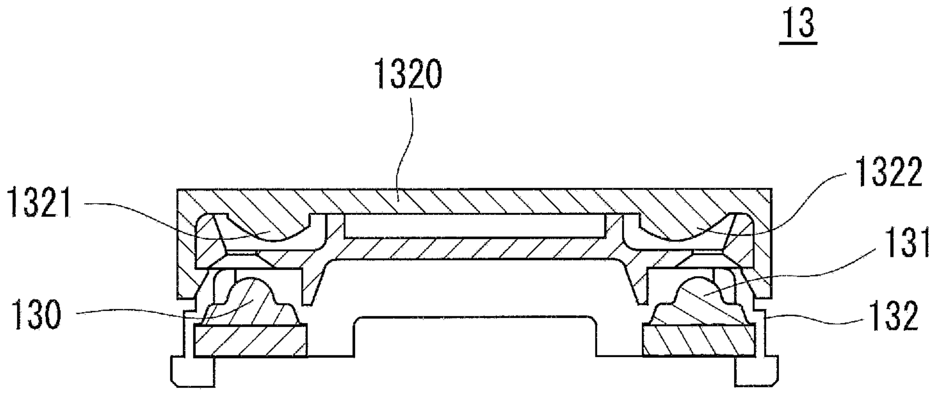
FIG. 6 is a schematic cross-sectional view illustrating an example of the contactless detection mechanism included in the push button switch according to the invention.

The contactless detection mechanism 13 is further described. FIG. 5 is a schematic perspective view illustrating an example of the contactless detection mechanism 13 included in the push button switch 1 according to the invention. FIG. 6 is a schematic cross-sectional view illustrating an example of the contactless detection mechanism 13 included in the push button switch 1 according to the invention. FIG. 6 is a figure illustrating the cross-section of the contactless detection mechanism 13 included in the push button switch 1 of the invention so that the top in the figure is the front of the push button switch 1. The contactless detection mechanism 13 includes various components, such as a light emitting element 130 that emits light, a light receiving element 131 that detects light, a light shielding member 132 that covers the light emitting element 130 and the light receiving element 131, etc., and a control part 133 (see FIG. 7, etc.) that controls the contactless detection mechanism 13.

The light emitting element 130 is formed by using an optical element, such as an LED, that emits light. The light receiving element 131 is formed by using an optical element, such as a photo diode (PD), a photo transistor (PT).

The light shielding member 132 is formed in a parallelepiped box shape with an open rear surface. The light shielding member 132 is disposed in the housing 11, so as to cover the light emitting element 130 and the light receiving element 131. By covering the light emitting element 130 and the light receiving element 131, the light shielding member 132 limits the emission direction of the light emitted by the light emitting element 130, and prevents the light receiving element 131 from detecting light other than light that serves as a target. In particular, the light shielding member 132 prevents the light emitted from the illumination member 14 disposed inside the housing 11 from being detected by the light receiving element 131. The front surface of the light shielding member 132 serves as a light passing part 1320 selectively allowing light of a prescribed wavelength, such as infrared light, from passing, and allows light such as infrared light emitted from the light emitting element 130 and light such as infrared light to be received by the light receiving element 131 to pass through. At the rear part of the light shielding member 132 formed on the front surface of the light shielding member 132, a lens 1321 for light emission which limits the irradiation range of the light emitted by the light emitting element 130 and a lens 1322 for light reception which limits the range of the light received by the light receiving element 131 are formed by using optical materials, such as a convex lens.

Figure 7:
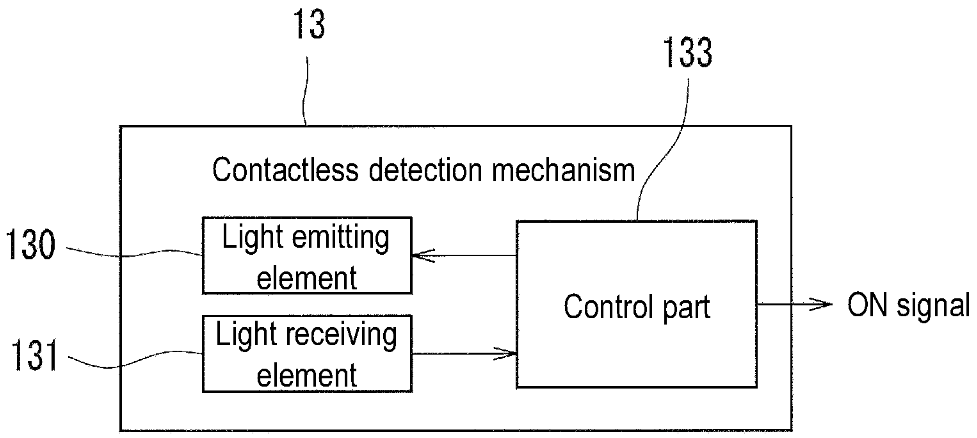
FIG. 7 is a functional block diagram schematically illustrating a control configuration of the contactless detection mechanism included in the push button switch according to the invention.

FIG. 7 is a functional block diagram schematically illustrating a control configuration of the contactless detection mechanism 13 included in the push button switch 1 according to the invention. The contactless detection mechanism 13 of the push button switch 1 includes the control part 133 using an integrated circuit (IC), such as an IC, a large scale IC (LSI), a very large scale IC (VLSI), and controls the entire mechanism including the light emitting element 130 and the light receiving element 131 by using the control part 133. The control part 133 causes the light emitting element 130 to emit light in a prescribed light emitting pattern based on a light emitting signal by outputting the light emitting signal of the light emitting pattern to the light emitting element 130. In addition, the control part 133 senses the detection of light by the light receiving element 131. In the case of determining that the light receiving element 131 detects the reflected light of the light emitted from the light emitting element 130, the control part 133 outputs an ON signal to a control circuit of an elevator body. The control part 133 may be accommodated in the housing 11, and may also be disposed outside the housing 11.

<Operation>

Figure 8:
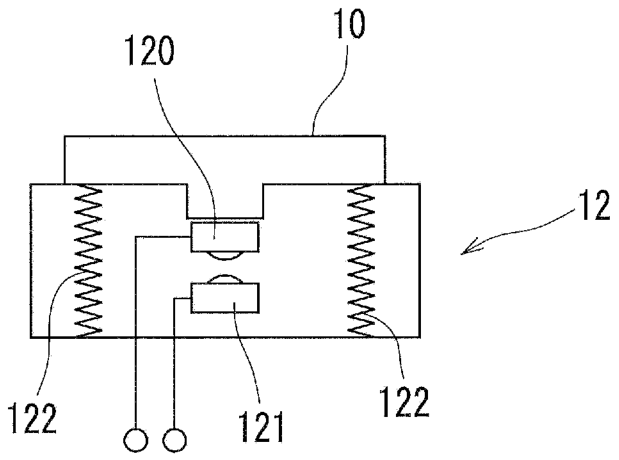
FIG. 8 is a schematic cross-sectional view illustrating an example of an operation of the mechanical contact mechanism included in the push button switch according to the invention.
Figure 9:
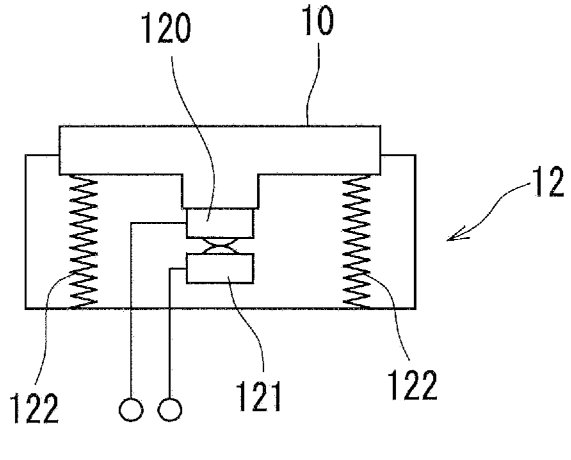
FIG. 9 is a schematic cross-sectional view illustrating an example of an operation of the mechanical contact mechanism included in the push button switch according to the invention.

Next, an operation of the push button switch 1 of the invention is described. Firstly, the mechanical contact mechanism 12 is described. FIGS. 8 and 9 are schematic cross-sectional views illustrating an example of an operation of the mechanical contact mechanism 12 included in the push button switch according to the invention. FIG. 8 illustrates a state in which the push button 10 of the push button switch 1 is not pushed, and FIG. 9 illustrates a state in which the push button 10 of the push button switch 1 is pushed. As shown in FIG. 8, in the case where the push button 10 is not pushed, the movable contact 120 attached to the rear part (the lower part in FIGS. 8 and 9) of the push button 10 is separated from the fixed contact 121, and the circuit is in an open state. As shown in FIG. 9, when the push button 10 is pushed by the operator, the movable contact 120 linked with the push button 10 moves rearward and comes into contact with the fixed contact 121, and the circuit is closed. In the case where the circuit is closed, the mechanical contact mechanism 12 outputs an ON signal to the control circuit of the elevator body. When the operator releases the push, the biasing member 122 biases the push button 10 forward, the movable contact 120 is linked with the forward movement of the push button 10 and separated from the fixed contact 121, and the circuit becomes open.

Figure 10:
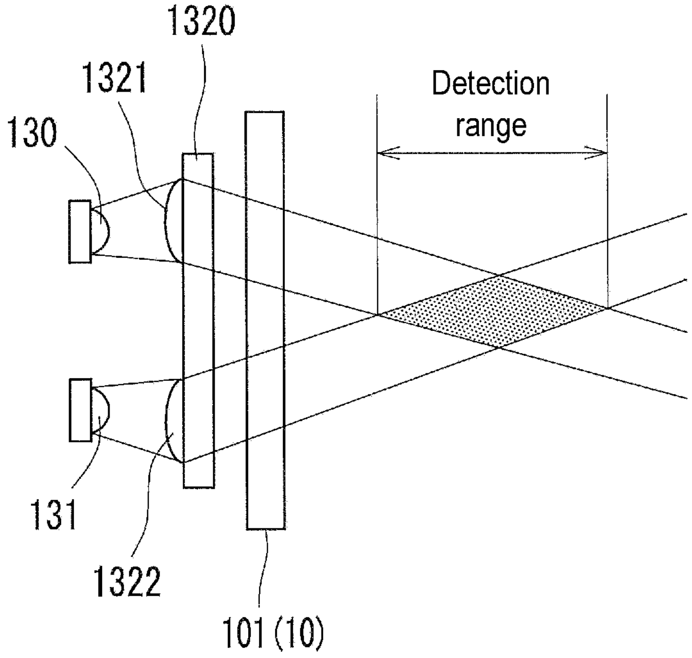
FIG. 10 is a schematic view schematically illustrating an example of a light path relating to the contactless detection mechanism included in the push button switch according to the invention.
Figure 11:
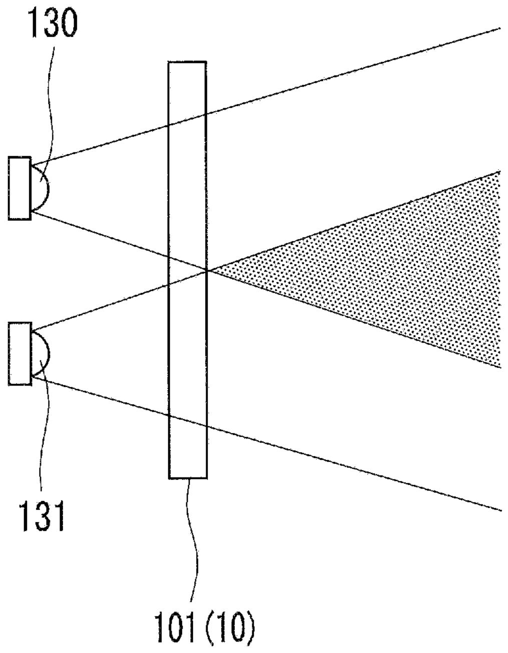
FIG. 11 is a schematic view schematically illustrating an example of a light path relating to the contactless detection mechanism included in the push button switch according to the invention.

FIGS. 10 and 11 are schematic views schematically illustrating an example of a light path relating to the contactless detection mechanism 13 included in the push button switch 1 according to the invention. FIG. 10 illustrates a mode of the contactless detection mechanism 13 described by using FIG. 6 as a first embodiment of the push button switch 1 of the invention. As comparison, FIG. 11 illustrates another embodiment without the lens 1321 for light emission and the lens 1322 for light reception. As shown in FIG. 10, the lens 1321 for light emission included in the contactless detection mechanism 13 refracts the light emitted by the light emitting element 130, and limits the light irradiation range. In addition, the lens 1322 for light reception limits the range of the light received by the light receiving element 131. In FIGS. 10 and 11, the irradiation range of the light emitted by the light emitting element 130 and the range of the light received by the light receiving element 131 are indicated in solid lines, and a range in which the irradiation range and the light reception range are overlapped is shown as a detection range by stippling. If an object such as a human finger is present within the detection range in which the irradiation range and the light reception range are overlapped, the light receiving element 131 can detect the reflected light of the light emitted by the light emitting element 130. Compared with the another embodiment shown in FIG. 11, the push button switch 1 of the first embodiment shown in FIG. 10 limits the detection range of the object by limiting the irradiation range and the light reception range with the lens 1321 for light emission and the lens 1322 for light reception. Specifically, in the push button switch 1 of the first embodiment shown in FIG. 10, the vicinity of the front surface of the translucent part 101 formed at the push button 10 is excluded from the detection range. In addition, a prescribed distance or further away from the push button 10 is excluded from the detection range. In addition, in upper-lower and left-right directions orthogonal to the front surface direction as well, the detection range is narrower than that of the another embodiment shown in FIG. 11. By excluding the vicinity of the front surface, including the surface of the push button 10, from the detection range, for example, it is possible to avoid an erroneous detection with respect to the operation of a person, such as a visually impaired person, who recognizes the position of the push button 10 by tactile sensation. By excluding the prescribed distance or further away from the push button 10 from the detection range, it is possible to avoid an erroneous detection which responds to an object not approaching. By reducing the detection range in the upper-lower and left-right directions, it is possible to avoid an erroneous detection, such as responding to a finger approaching another push button 10.

Figure 12:
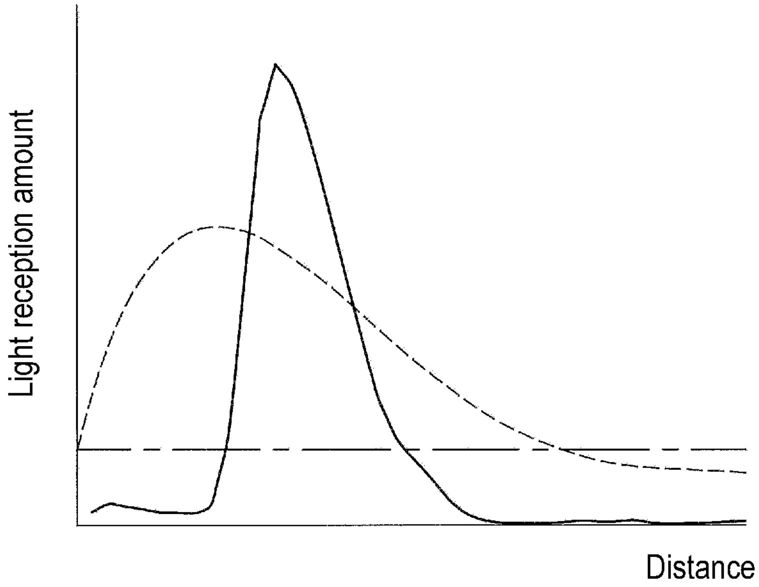
FIG. 12 is a graph illustrating an example of a relationship between a distance from a push button surface and a light reception amount relating to the contactless detection mechanism included in the push button switch according to the invention.

FIG. 12 is a graph illustrating an example of a relationship between a distance from the surface of the push button 10 and the light reception amount relating to the contactless detection mechanism 13 included in the push button switch 1 according to the invention. In FIG. 12, the solid line illustrates a graph relating to the first embodiment including the lens 1321 for light emission and the lens 1322 for light reception, as shown in FIG. 10, etc., and the broken line illustrates, as comparison, a graph relating to the another embodiment without the lens 1321 for light emission and the lens 1322 for light reception, as shown in FIG. 11. In FIG. 12, the distance from the surface of the push button 10 is set as the horizontal axis, and the light reception amount detected by the light receiving element, as reflected light, is set as the vertical axis, and the relationship therebetween is shown. The light reception amount gradually increases as the distance from the surface of the push button 10 increases, peaks at a prescribed distance, and gradually decreases. As shown by the dot-chain line in FIG. 12, by suitably setting a threshold, a range of the distance in which the light reception amount exceeds the threshold is set as the detection range in actual installation. By providing the lens 1321 for light emission and the lens 1322 for light reception, the peak of the light reception amount is narrowed and heightened, and the detection accuracy as well as detection sensitivity can be facilitated.

Although the push button switch 1 of the invention achieves various effects, such as limiting the detection range, with the configuration including the lens 1321 for light emission and the lens 1322 for light reception using convex lenses, a configuration without the convex lenses is also possible.

Figure 13:
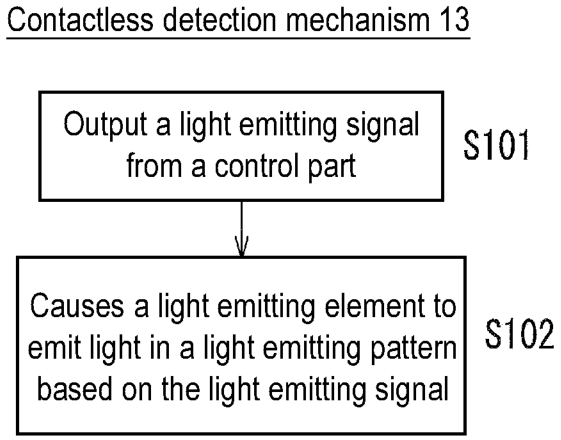
FIG. 13 is a flowchart illustrating an example of a light emitting process of the contactless detection mechanism included in the push button switch according to the invention.

In the following, the control of the contactless detection mechanism 13 included in the push button switch 1 of the invention is described. FIG. 13 is a flowchart illustrating an example of a light emitting process of the contactless detection mechanism 13 included in the push button switch 1 according to the invention. The contactless detection mechanism 13 sets a start condition, such as a power start, inputting of a start signal from the control circuit of the elevator body, etc., as a trigger and starts the light emitting process. The contactless detection mechanism 13 outputs, to the light emitting element 130, the light emitting signal based on the prescribed light emitting pattern set in advance from the control part 133 (S101), and the light emitting element 130 emits light in the light emitting pattern based on the input light emitting signal (S102). The output of the light emitting signal based on the light emitting pattern from the control part 133, for example, is an output of a pulse pattern that can be set appropriately, such as repetitively emitting light of a prescribed time at a prescribed interval for a prescribed number of times. The light emission of the light emitting element 130 due to the light emitting signal in the prescribed light emitting pattern set in advance is executed repetitively.

Figure 14:
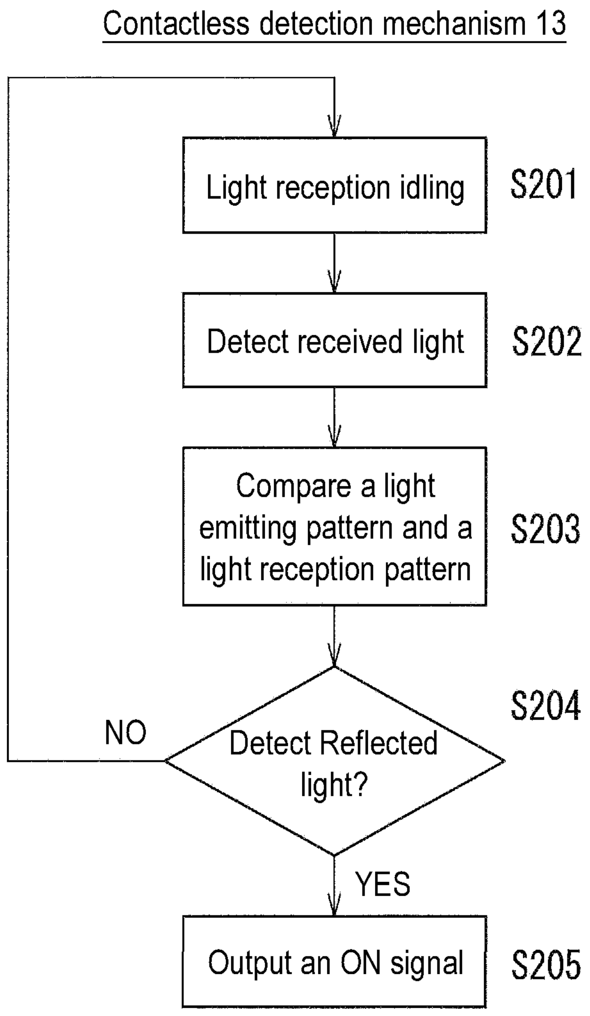
FIG. 14 is a flowchart illustrating an example of a light reception process of the contactless detection mechanism included in the push button switch according to the invention.

FIG. 14 is a flowchart illustrating an example of a light reception process of the contactless detection mechanism 13 included in the push button switch 1 according to the invention. The contactless detection mechanism 13 sets a start condition, such as a power start, inputting of a start signal from the control circuit of the elevator body, etc., as a trigger, and starts the light reception process. The control part 133 sets the light receiving element 131 to a light reception idling state (S201). When the light receiving element 131 detects light reception (S202), the control part 133 compares a light reception pattern detected by the light receiving element 131 and the prescribed light emitting pattern which is set in advance and emitted by the light emitting element 130 (S203). By comparing the light emitting pattern and the light reception pattern in Step S203, whether the detected light is the reflected light of the light emitted from the light emitting element 130 is determined. In particular, by setting a different light emitting pattern for each push button switch 1, an erroneous detection of the reflected light of the light emitted from another push button switch 1 can be prevented.

Based on the comparison in Step S203, the control part 133 determines whether the detection of light by the light receiving element 131 is a detection of the reflected light of the light emitted from the light emitting element 130 (S204). In the case where the light emitting pattern and the light reception pattern conform to each other, as a result of the comparison of Step S203, the control part 133 determines, in Step S204, that the reflected light is detected, and in the case where the light emitting pattern and the light reception pattern do not conform to each other, the control part 133 determines that the detected light is not the reflected light. In the case of determining that the reflected light is detected (S204: YES) in Step S204, the control part 133 outputs the ON signal (S205). In Step S205, the contactless detection mechanism 13 outputs, by using the control part 133, the ON signal to the control circuit of the elevator body. After the outputting of the ON signal of Step S205 ends, the contactless detection mechanism 13 returns to the light reception idling state.

In the case of determining that the light emitting pattern and the light reception pattern do not conform to each other in Step S204 (S204: NO), the contactless detection mechanism 13 returns to the light reception idling state.

According to the above, in the case where the control part 133 controls the contactless detection mechanism 13 of the push button switch 1 and the contactless detection mechanism 13 determines that the light receiving element 131 detects the reflected light of the light emitted from the light emitting element 130, the contactless detection mechanism 13 outputs the ON signal to the control circuit of the elevator body.

Second Embodiment

The second embodiment is a mode with a different configuration of the contactless detection mechanism 13 in the first embodiment. In the second embodiment, for the configuration same as the first embodiment, reference symbols same as those of the first embodiment are labeled, and the detailed description thereof is omitted. In the second embodiment, the configuration other than the contactless detection mechanism 13 and the control exerted by the control part 133 are the same as the first embodiment. Therefore, the descriptions thereof are omitted.

Figure 15:
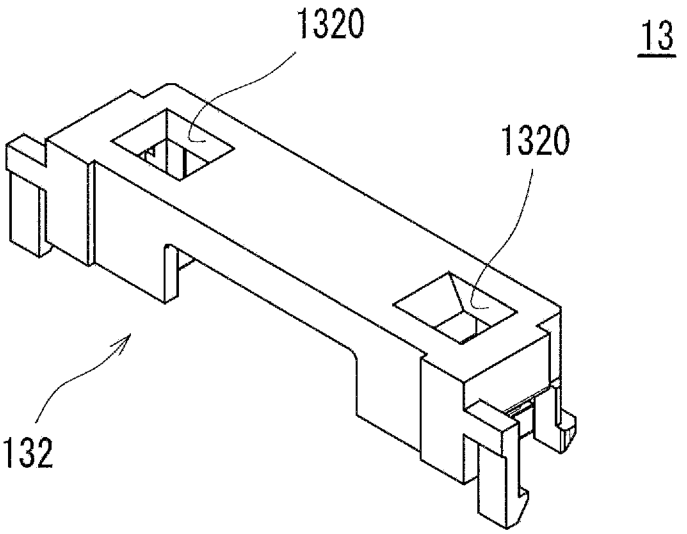
FIG. 15 is a schematic perspective view illustrating an example of a contactless detection mechanism included in the push button switch according to the invention.
Figure 16:
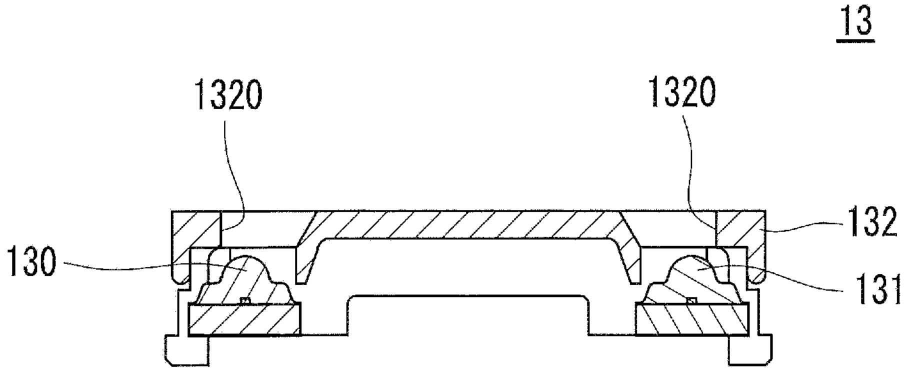
FIG. 16 is a schematic cross-sectional view illustrating an example of the contactless detection mechanism included in the push button switch according to the invention.

FIG. 15 is a schematic perspective view illustrating an example of the contactless detection mechanism 13 included in the push button switch 1 according to the invention. FIG. 16 is a schematic cross-sectional view illustrating an example of the contactless detection mechanism 13 included in the push button switch 1 according to the invention. FIG.

16 is a figure illustrating the cross-section of the contactless detection mechanism 13 included in the push button switch 1 of the invention so that the top in the figure is the front of the push button switch 1. On the front surface of the light shielding member 132, the light passing part 1320 allowing the light emitted from the light emitting element 130 to pass through is provided as an opening in a substantially rectangular shape, and, additionally, the light passing part 1320 allowing the light to be received by the light receiving element 131 to pass through is provided as an opening in a substantially rectangular shape. That is, the light shielding member 132 according to the second embodiment is a mode in which, instead of arranging the entire front surface as the light passing part 1320, openings serving as the light passing parts 1320 are provided. By appropriately designing the sizes and the positions of the light passing parts 1320, the contactless detection mechanism 13 according to the second embodiment limits the irradiation range of the light emitted by the light emitting element 130 and further limits the range of the light received by the light receiving element 131. It is noted that, in addition of simply being configured as an opening, the light passing part 1320 may also be arranged to fit a filter selectively allowing light, such as infrared light, to pass through, and may also be arranged to fit a lens, such as a Fresnel lens, formed in a substantially planar shape.

According to the above, as shown and described in the first and second embodiments, the push button switch 1 according to the invention includes the mechanical contact mechanism 12 using the push button 10 that is pushable and the contactless detection mechanism 13 using the light emitting element 130 and the light receiving element 131. The light receiving element 131 detects the light emitted from the light emitting element 130 and reflected by an object, such as a human finger. Accordingly, in addition to a pushing operation of the push button 10, the push button switch 1 according to the invention achieves excellent effects, such as allowing a contactless operation by detecting the light reflected by an object. The detection through the contactless detection mechanism 13 not only facilitates the convenience, but also achieves various effects, such as hygiene improvement through avoiding direct contact, as well as suppressing a failure by reducing the number of times of mechanical operations.

Also, the push button switch 1 according to the invention limits the irradiation range of the light emitted from the light emitting element 130 and also limits the range of the light received by the light receiving element 131 through the configuration of disposing the lens 1321 for light emission and the lens 1322 for light reception, forming the light passing part 1320 as an opening, etc. The push button switch 1 according to the invention limits the detection range of the object by limiting the irradiation range and the light reception range. Specifically, the vicinity of the front surface of the push button 10 is excluded from the detection range, and the prescribed distance or further away from the push button 10 is excluded from the detection range. In addition, the detection range in the upper-lower and left-right directions orthogonal to the front surface direction is reduced. By excluding the vicinity of the front surface, including the surface of the push button 10, from the detection range, for example, it is possible to avoid an erroneous detection with respect to the operation of a person, such as a visually impaired person, who recognizes the position of the push button 10 by tactile sensation. By excluding the prescribed distance or further away from the push button 10 from the detection range, it is possible to avoid an erroneous detection which responds to an object not approaching. The push button switch 1 according to the invention achieves an excellent effect such as being able to avoid an erroneous detection, such as responding to a finger approaching another push button 10, by reducing the detection range in the upper-lower and left-right directions.

In addition, the push button switch 1 according to the invention includes the light shielding member 132 covering the light emitting element 130 and the light receiving element 131. Since light is shielded by the light shielding member 132, the emission direction of the light emitted by the light emitting element 130 is limited, and the light receiving element 131 is prevented from detecting light other than light that serves as the target. In particular, the light shielding member 132 prevents the light emitted from the illumination member 14 disposed inside the housing 11 from being detected by the light receiving element 131. Accordingly, the push button switch 1 according to the invention achieves an excellent effect, such as being able to effect light emission of the push button 10 by using the illumination member 14 while realizing contactless detection using light.

Moreover, the push button switch 1 according to the invention causes the light emitting element 130 to emit light in the prescribed light emitting pattern, compares the light reception pattern of the light detected by the light receiving element 131 with the light emitting pattern, and, in the case where the light emitting pattern and the light reception pattern conform to each other, determines that the light detected by the light receiving element 131 is the reflected light of the light emitted from the light emitting element 130. Accordingly, the push button switch 1 according to the invention is able to prevent erroneous detection of light other than the reflected light, and, in particular, achieves an excellent effect, such as being able to prevent an erroneous detection of the reflected light of the light emitted by another push button switch 1 by setting a different light emitting pattern for each push button switch 1.

The invention is not limited to the respective embodiments described above, and can be developed into various other forms. Therefore, the above embodiments are merely examples in all respects, and should not be construed in a restrictive manner. The technical scope of the invention is described in accordance with the claims and is not limited to the text of the specification. Furthermore, all modifications and changes that fall within a scope equivalent to the scope of claims are within the scope of the invention.

For example, in the embodiments, a mode applied as a switch for operating an elevator is shown. However, the invention is not limited thereto. The push button switch 1 other than a switch for operating an elevator may also be applied as various push button switches, such as a switch for operating an industrial robot, for example.

In addition, for example, a mode in which one light shielding member 132 covers both of the light emitting element 130 and the light receiving element 131 is shown in the embodiments. However, the invention is not limited thereto. It is possible to develop various modes, such as covering the light emitting element 130 and the light receiving element 131 by using respectively different light shielding members 132, etc.

What is claimed is:

1. A push button switch, comprising: a push button that is pushable; a movable contact that is linked to the push button; and a fixed contact that comes into contact or separates from the movable contact through operation of the movable contact, wherein the push button switch further comprises:

a light emitting element, emitting light;

a light receiving element, detecting light, wherein the light receiving element is configured to detect light reflected by an object reflecting the light emitted by the light emitting element within a prescribed region;

a lens for light emission that limits an irradiation range of the light emitted by the light emitting element;

a lens for light reception that limits a light reception range of light received by the light receiving element;

an illumination member which illuminates the push button with visible light from an inner side, wherein the movable contact and the fixed contact are disposed in a middle region of an inner space of the push button so as to separate the illumination member from the light emitting element and the light receiving element; and a light shielding member, disposed in the inner space of the push button and covering the light emitting element and the light receiving element, wherein the light shielding member comprises a light shielding partition part disposed between the lens for light emission and the lens for light reception so as to optically isolate the lens for light emission and the lens for light reception.

2. The push button switch as claimed in claim 1, wherein the light shielding member further comprises a light passing part allowing the light emitted by the light emitting element to pass through.

3. The push button switch as claimed in claim 1, wherein the light shielding member further comprises a light passing part allowing light to be received by the light receiving element to pass through.

4. The push button switch as claimed in claim 1, wherein the light shielding member further comprises a light passing part allowing the light emitted by the light emitting element and light to be received by the light receiving element to pass through, and the light passing part is integrally formed with the lens for light emission and the lens for light reception.

5. The push button switch as claimed in claim 1, comprising:

a means which causes the light emitting element to emit light in a predetermined light emitting pattern;

a means which compares a light reception pattern of light detected by the light receiving element with the predetermined light emitting pattern; and a means which, in a case where the light reception pattern conforms to the predetermined light emitting pattern, determines that reflected light of the light emitted in a predetermined light emitting pattern from the light emitting element is detected.

6. The push button switch as claimed in claim 1, wherein the light emitting element, the light receiving element, the lens for light emission, and the lens for light reception are disposed relative to each other such that the irradiation range and the light reception range overlap to form the prescribed region, wherein the prescribed region is spaced apart from a front surface of the push button, thereby excluding a vicinity of the front surface of the push button from the prescribed region.

7. The push button switch as claimed in claim 1, wherein the light shielding member is positioned to prevent the light-receiving element from detecting light emitted from the illumination member.

* * * * *